(12) United States Patent
Garcia-Fernandez et al.

(10) Patent No.: US 11,263,177 B2
(45) Date of Patent: Mar. 1, 2022

(54) IDENTIFICATION OF PORTIONS OF DATA

(71) Applicant: Child Rescue Coalition, Inc., Boca Raton, FL (US)

(72) Inventors: Jose Omar Garcia-Fernandez, Weston, FL (US); William Scott Wiltse, Boca Raton, FL (US)

(73) Assignee: Child Rescue Coalition, Inc., Boca Raton, FL (US)

( * ) Notice: Subject to any disclaimer, the term of this patent is extended or adjusted under 35 U.S.C. 154(b) by 446 days.

(21) Appl. No.: 16/253,832

(22) PCT Filed: Aug. 1, 2017

(86) PCT No.: PCT/US2017/044877
§ 371 (c)(1),
(2) Date: Jan. 22, 2019

(87) PCT Pub. No.: WO2018/026802
PCT Pub. Date: Feb. 8, 2018

(65) Prior Publication Data
US 2019/0324645 A1 Oct. 24, 2019

Related U.S. Application Data

(60) Provisional application No. 62/369,833, filed on Aug. 2, 2016.

(51) Int. Cl.
*G06F 16/14* (2019.01)
(52) U.S. Cl.
CPC .................................. *G06F 16/152* (2019.01)

(58) Field of Classification Search
CPC ....... G06F 16/152; G06F 16/14; G06F 16/148
See application file for complete search history.

(56) References Cited

U.S. PATENT DOCUMENTS

| | | | |
|---|---|---|---|
| 8,433,959 B1 * | 4/2013 | Garfinkel | G06F 3/0683 714/718 |
| 9,792,289 B2 | 10/2017 | Reininger et al. | |
| 2009/0083852 A1 * | 3/2009 | Kuo | G06F 21/564 726/22 |
| 2009/0287647 A1 * | 11/2009 | Haggerty | G06F 16/583 |
| 2013/0013618 A1 * | 1/2013 | Heller | G06F 16/174 707/747 |
| 2013/0227604 A1 | 8/2013 | Shields et al. | |

OTHER PUBLICATIONS

PCT International Search Report dated Dec. 11, 2017 for PCT International Application No. PCT/US17/44877 2017.
PCT International Preliminary Report on Patentability completed Jul. 24, 2018 for PCT International Application No. PCT/US17/44877 2018.
PCT Written Opinion of the International Search Authority dated Dec. 11, 2017 for PCT International Application No. PCT/US17/44877. 2017.

* cited by examiner

*Primary Examiner* — Grace Park
(74) *Attorney, Agent, or Firm* — Fleit Intellectual Property Law; Jon Gibbons

(57) ABSTRACT

Disclosed is a novel system and process for automating the process of identifying deleted file chunks. The present invention has two components. A client component to identify data chunks and a server component for storage and indexing technology for the over 1 billion records relating to the data chunks necessary to run the software.

20 Claims, 10 Drawing Sheets

700

| 0000 | 89 56 4E 47 | 60 6A 1A 6A | 00 00 00 00 | 49 48 44 52 | .PNG.....IMCR |
| 0010 | 00 00 01 E3 | 00 00 01 E4 | 05 06 09 00 | 00 00 72 47 | ............rG |
| 0820 | 88 00 00 BC | AC 49 44 41 | 54 78 DA EC | 90 87 90 14 | .....IDATx..... |
| 0830 | C5 F6 FE F9 | 2F BE CF 4F | AF 99 9C 45 | 87 10 51 C1 | ..../..O...E0.Q. |

702 — FILE HEADER / FOOT ANALYSIS
704 — FRAME HEADER IDENTIFICATION
706 — "MAGIC BYTES"
708 — BYTE COUNT (FILE SIZE)
710 — PLAIN-TEXT LANGUAGE RECOGNITION

IDENTIFICATION OF PORTIONS OF DATA

CROSS-REFERENCE TO RELATED APPLICATIONS

This application is based upon and claims priority to U.S. Provisional Patent Application Ser. No. 62/369,833, filed on Aug. 2, 2016, the disclosure of which is hereby incorporated by reference in its entirety.

BACKGROUND

This invention relates generally to methods and systems for computer data management and tracking. Specifically, it relates to methods and systems of identifying content.

The recovery of deleted files is one of the greatest challenges in effectively prosecuting the most organized criminal activities including child pornography, human trafficking and terrorisms, who often cover their tracks by deleting offending files. When those files are "deleted," fragmented remnants, known as "clusters" or "chunks," still exist and are scattered throughout the computer's hard drive. By collecting and analyzing those chunks, forensic analysts can sometimes reconstruct and identify a small percentage of the offending files. This process is extremely painstaking and time-consuming and its difficulty means that, in most cases, only a small fraction of the relevant data is recovered, rendering the accurate determination of the true extent of criminal activity essentially impossible.

As Internet technology becomes more advanced, pervasive, and accessible, the use of that technology for criminal activity including the exploitation of children, human trafficking, and terrorism has increased dramatically.

Online offenders are increasing their efforts to evade detection. They often delete files from their hard drives and other devices while using anonymization tools in an effort to evade detection and avoid apprehension.

Another area of criminal activity is political violence such as terrorism. Criminals make increasing use of computers for planning and recruiting.

The rise in criminal digital evidence has also soared. According to Luc Beirens, Superintendent of the Federal Computer Crime Unit (FCCU) in Belgium, "the number of seized computers is a multitude of the number that was seized ten years ago. Every suspect owns more than one computer e.g. a desktop computer, a laptop, an iPad, and a smart phone. In addition many users have a number of external hard disks. All those systems need to be investigated."

It is simply not possible to manage the sheer volume of digital evidence in criminal cases. The backlog of caseloads from law enforcement agencies worldwide has grown from weeks to months to in some cases years. Digital forensic specialists cannot be trained fast enough. Further, the number of specialists required to analyze the mountains of digital evidence in common crimes is far greater than the specialists that are available.

Computer forensic products on the market today that provide recovery of deleted hard drive files are limited to searches for a small number of files and for those files that are small in size. These products do so by identifying 'header values'. For that type of search, they work very well. When the investigator is scanning a hard drive, he is looking for a large number of files that are large in size. The investigator is looking for millions of possible files. The available tools simply do not work.

The burdensome process of identifying deleted files greatly hinders the criminal prosecution of individuals and sometimes prevents it altogether. This is one of the greatest challenges in effectively prosecuting the most organized and prolific criminals who often cover their tracks by deleting offending files. The difficulty of the computer forensic investigations is the primary source of delay in investigations, which makes it essentially impossible to accurately and comprehensively search the entirety of a criminal's hard drive. These obstacles all work to significantly hinder—and often entirely prevent—the full and effective investigation and prosecution of crimes. This allows technologically criminals to escape prosecution.

BRIEF SUMMARY

The present invention revolutionizes the field of computer forensics by automating the process of identifying deleted file chunks. The present invention has two components. A client component to identify data chunks and a server component for storage and indexing technology for the over 1 billion records relating to the data chunks necessary to run the software.

The foregoing and other features and advantages of the present invention will be apparent from the following more particular description of the preferred embodiments of the invention, as illustrated in the accompanying drawings.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
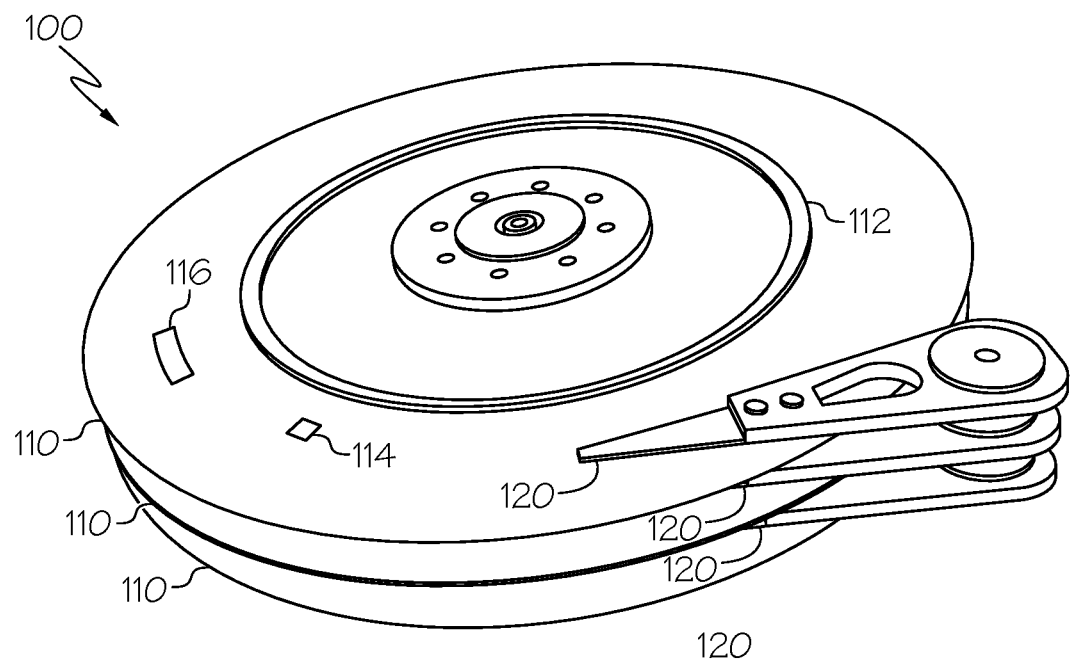
FIG. 1 is a diagram illustrating the major components of a mechanical hard drive.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

In fact, for any computer forensic process involving analysis of digital information for use as evidence in civil, criminal or administrative cases, the time for change is long overdue. Every law enforcement investigator benefits from quick turnaround of digital forensic evidence related to their criminal cases—from photos, videos, email, social media and Internet usage to audio and documents. Each day that a computer or mobile device sits in a forensic backlog waiting to be processed is one more day that a criminal remains on the street, and a child is left vulnerable to continued abuse.

Imagine the scenario of a typical child exploitation case. The computer examiner discovers a folder in the file structure of a suspect's hard drive containing homemade child pornographic images of the suspect molesting a preteen girl. Imagine the forensic analysis does not take place until a year after the computer's seizure during the execution of a search warrant at a suspect's residence. Finally, imagine that the images are of a neighbor and that there was insufficient evidence to establish probable cause for the suspect's arrest before examining the hard drive. In this scenario automated tools to accelerate the computer forensic examination could have prevented the victim from being abused for another year.

Cybercrime has fostered burgeoning demand for forensic examiner tools in law enforcement. A confluence of factors has increased the demand. These factors include:
- a number of seized devices increasing;
- the storage capacity of hard drives increasing;
- the automated forensic tools/algorithms for deleted file recovery are today limited to header searches e.g., processes remain manually-intensive; and
- the expertise required and demand for forensic examiners means scarcer resource doing more with less creating tremendous backlog and the single largest pain point in the criminal investigation process today.

Non-Limiting Definitions

The terms "a", "an" and "the" preceding an element or component are intended to include the plural forms as well, unless the context clearly indicates otherwise.

"Blocked list" also known as a "Black list" means a hash value that is not sent to the server. This list is based on history. Stated differently, it is not meaningful in finding CSE i.e. they are not unique. For example a hash value of a cluster containing null bytes or zero bytes is typically not sent to the server.

"Child Sexual Abuse" imagery or "CSE" means data on a storage media involving the use of a minor, or one appearing to be a minor, engaging in sexually explicit conduct.

"CRC 64" is a 64 bit cyclic redundancy check detecting code developed by W. Wesley Peterson.

"Cluster" is a logical unit of storage for a storage media, it typically is made up of one or more sectors.

"Data" is any multimedia file that may include, text, pictures, graphics, video, audio, or a combination.

"MD-160" is a cryptographic hash function developed by Hans Dobbertin et al.

"Network Device" is a physical device which is required to mediate communication and interaction between devices on a computer network.

"Sector" is stores a fixed amount of user-accessible data, traditionally 512 bytes for hard disk drives and 4096-byte for newer hard disk drives. It is the minimum storage unit of a storage media.

"Storage Media" is data storage device such as a hard disk, fixed disk, disk array, thumb drive, solid state drive, hybrid drive, and other devices for storing and retrieving digital information.

Overview of Storage Media

FIG. 1 is a diagram illustrating the major components of a magnetic hard drive 100. The major components of the magnetic hard drive 100 are one or more rotatable platters 110 and one or more read/write heads 120. The rotatable platters 110 are physically divided into disk drive tracks 112. Hard drives typically designated a minimum storage unit for any data recorded to a drive. This unit, referred to as a sector 114 consists of 512 characters or "bytes." As hard drive sizes have increased over time, the minimum storage unit has also increased and is now referred to as a cluster 116. The most common cluster size among conventional file systems is 4096 bytes (or 8 sectors).

Sector-based searching provides increased granularity, allowing investigators to better locate missing/deleted images, but also increases the overall database size required to store the necessary hash values. Cluster-based searching reduces the amount of time required to scan a drive along with minimum system requirements, but will increase the probability of missing part of a file that has been partially overwritten.

For example, take a 5 minutes long and 10 MB in size video file. The 10 MB is spread out over the hard drive in random pieces. In a sector view this file would be comprised of 20,480 distinct pieces; each of which would require a unique hash value stored in our master database. Cluster view would require storage of one eighth of that total, or 2560 unique hash values, thereby reducing the database impact overall.

Hash values are the unique representation of the contents of a sector or cluster and allow us to know definitively when a piece of a known child abuse file has been located. Although there are many types of hashing algorithms, it is important to select the optimal balance of accuracy and speed of calculation. This decision of the hashing algorithm selected must be made prior to the creation of the master database.

Figure 2:
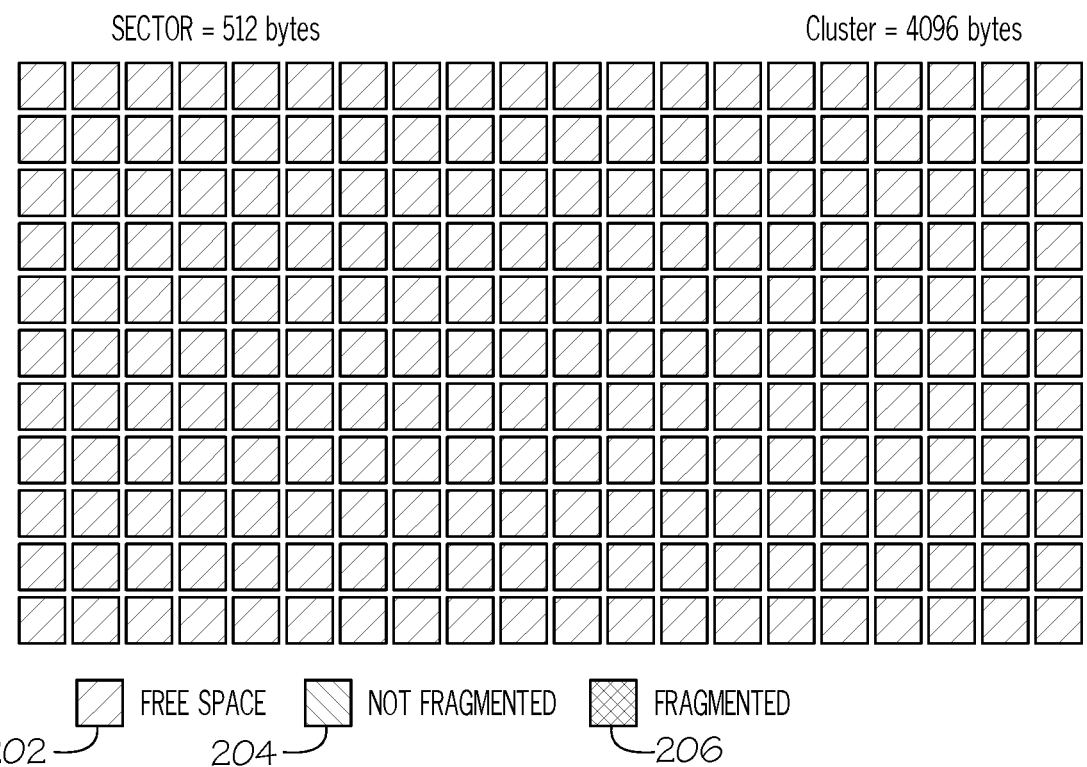
FIG. 2 is a functional block diagram of storage clusters with sectors and clusters.

FIG. 2 is a functional block diagram 200 of storage clusters illustrating either sectors of 512 byes or clusters of 4096 bytes, all as "free space" 202, i.e. available for data to be written. The term "not fragmented" 204 and "fragmented" 206 are further described below.

Figure 3:
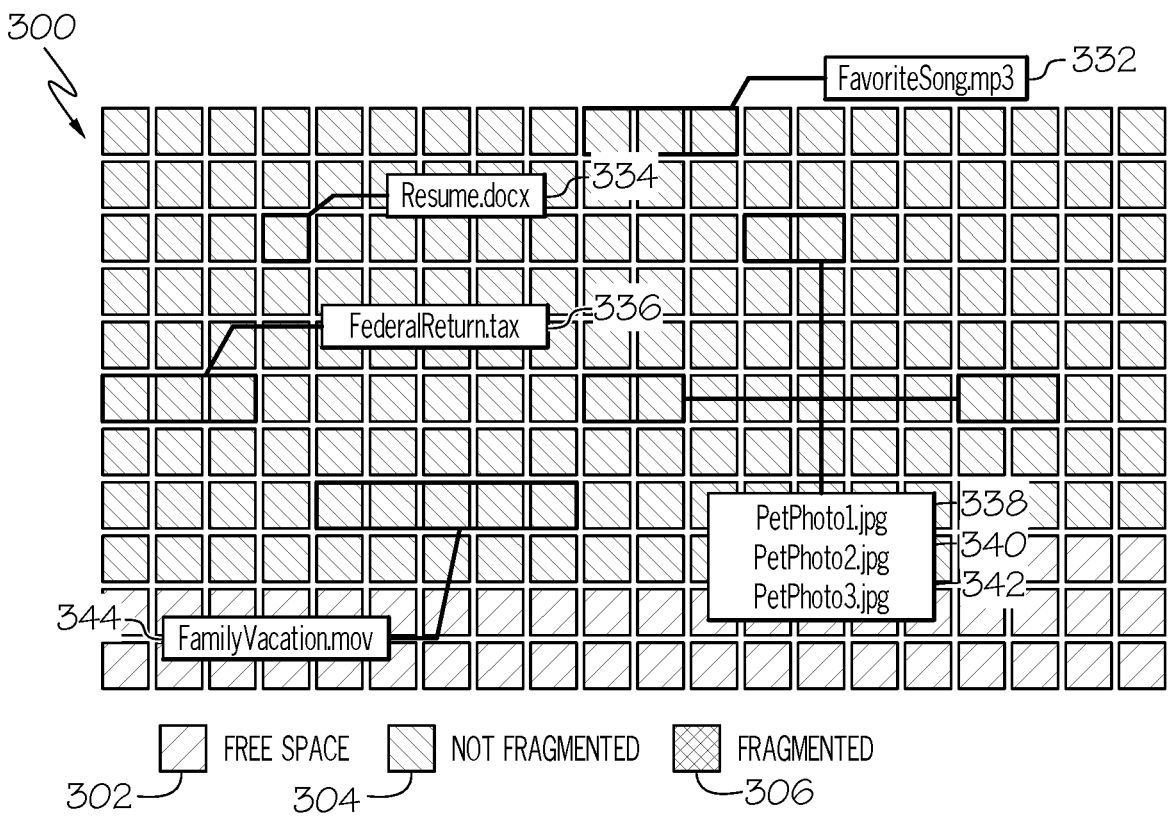
FIG. 3 is a functional block diagram illustrating portions of content stored in clusters with associated file names.

FIG. 3 is a functional block diagram 300 illustrating portions of content stored in clusters with associated file names Favoritesong.mp3 332, Resume.docx 334, FederalReturn.tax 336, PetPhoto1.jpg 338, PetPhoto2.jpg 340, and PetPhoto3.jpg 342, FamilyVacation.mov 344. The files displayed are a sampling of numerous files which exist within allocated drive space. All files in this example are written in contiguous or "non-fragmented" 304 clusters with free space 302 near the end. There are no "fragmented" 306 clusters in FIG. 3.

Figure 4:
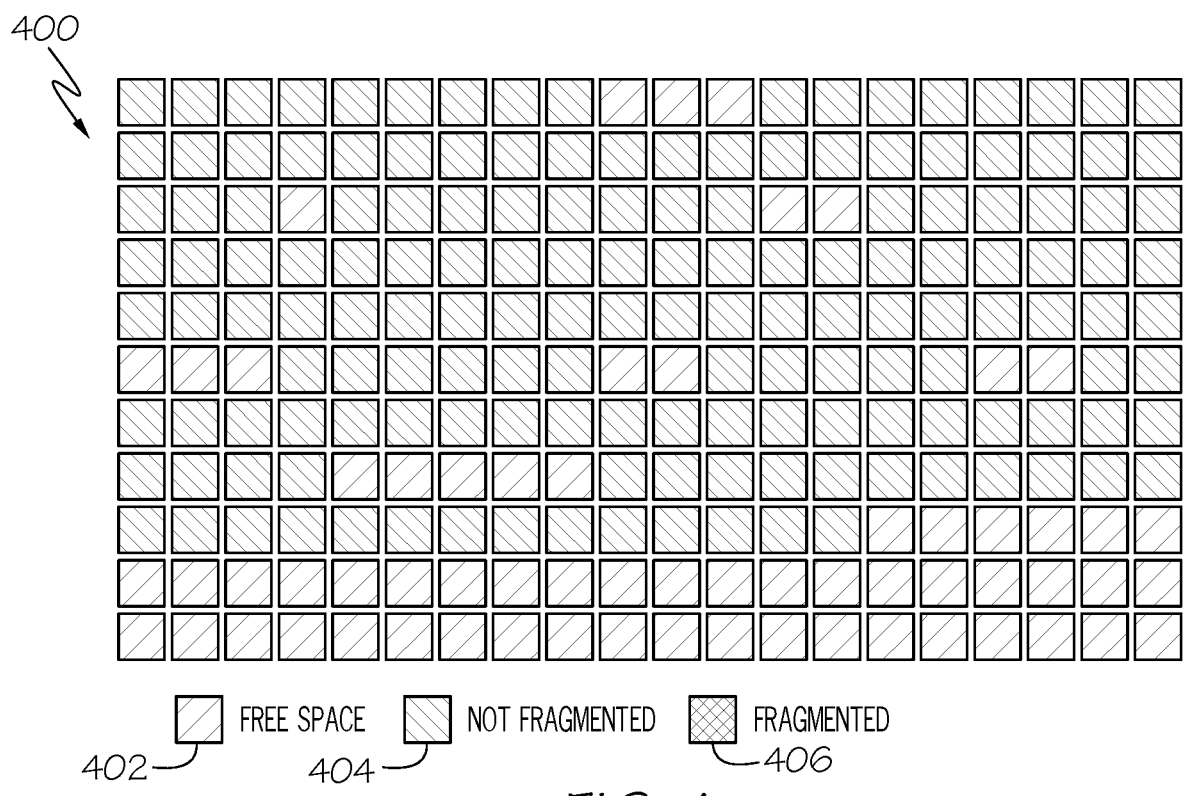
FIG. 4 is a functional block diagram of storage clusters of FIG. 3 after the associated files have been deleted and the clusters have been reclassified as unallocated.

FIG. 4 represents the same drive area 400 as FIG. 3 after the files shown have been deleted by a user and their respective clusters have been reclassified as unallocated or free space 402. There are "non-fragmented clusters" 404 shown. There are no "fragmented" 406 clusters in FIG. 4.

Figure 5:
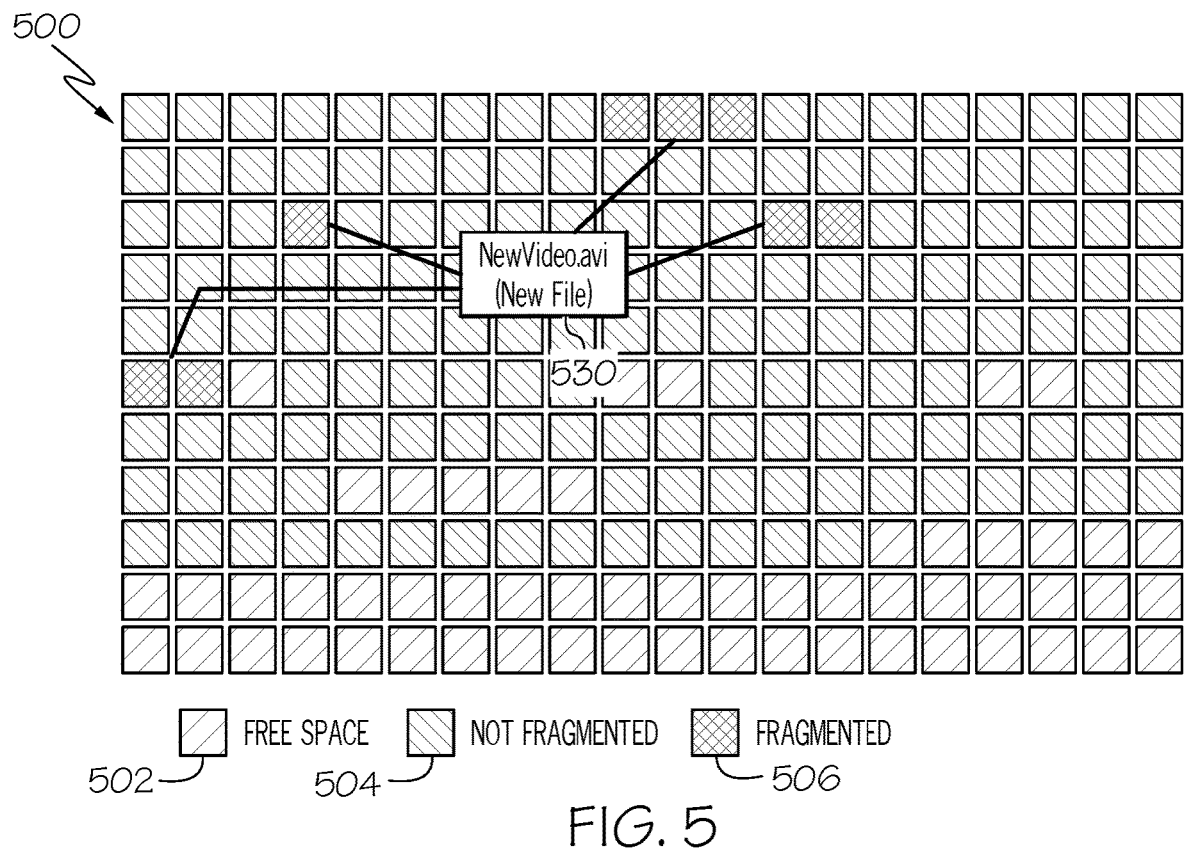
FIG. 5 is a functional diagram of a new video file in audio video interleave (avi) format stored on hard disk in a fragmented manner.

FIG. 5 is a high-level functional diagram 500 of a new video file in audio video interleave (avi) format 530 stored on hard disk in a fragmented manner, using the clusters freed in FIG. 4. Fragmentation is the condition of a hard disk in which files are divided into pieces scattered around the disk. Fragmentation occurs naturally the hard disk is used to create, delete, and modify files. At some point, the operating system needs to store parts of a file in noncontiguous clusters. In FIG. 5 all three cluster types are shown i.e. "free space" 502, "non-fragmented clusters" 504, and "fragmented clusters" 506.

Figure 6:
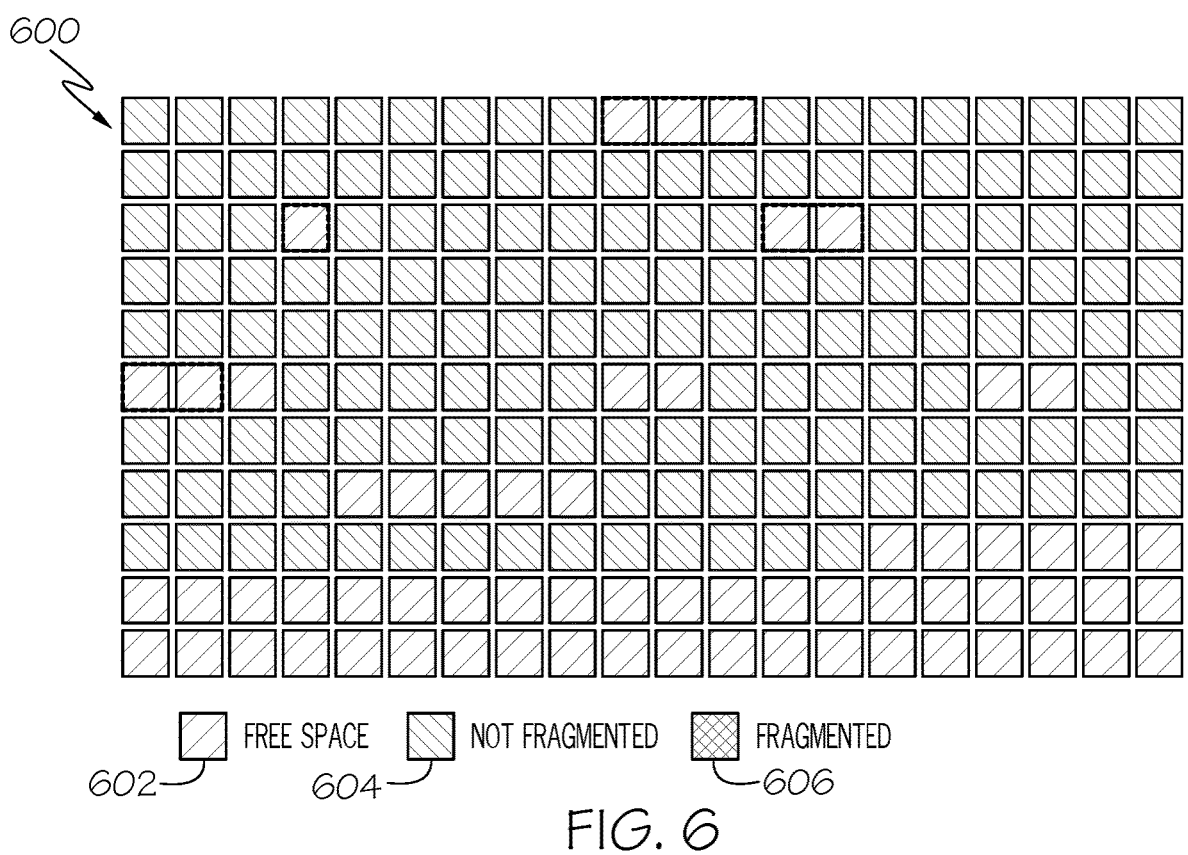
FIG. 6 is functional block diagram of storage clusters of FIG. 5 after the new video file has been deleted and the clusters have been reclassified as unallocated.

FIG. 6 is a functional diagram 600 illustrating the state of the drive in FIG. 5 after the new video file has been deleted by a user. Until these clusters are overwritten by a new file, the data contained within them is forensically recoverable. The different types of clusters of FIG. 5 for "free space" 602 and "non-fragmented" 604 and "fragmented" 606 are shown for ease of understanding in FIG. 6.

Figures 7, 8:
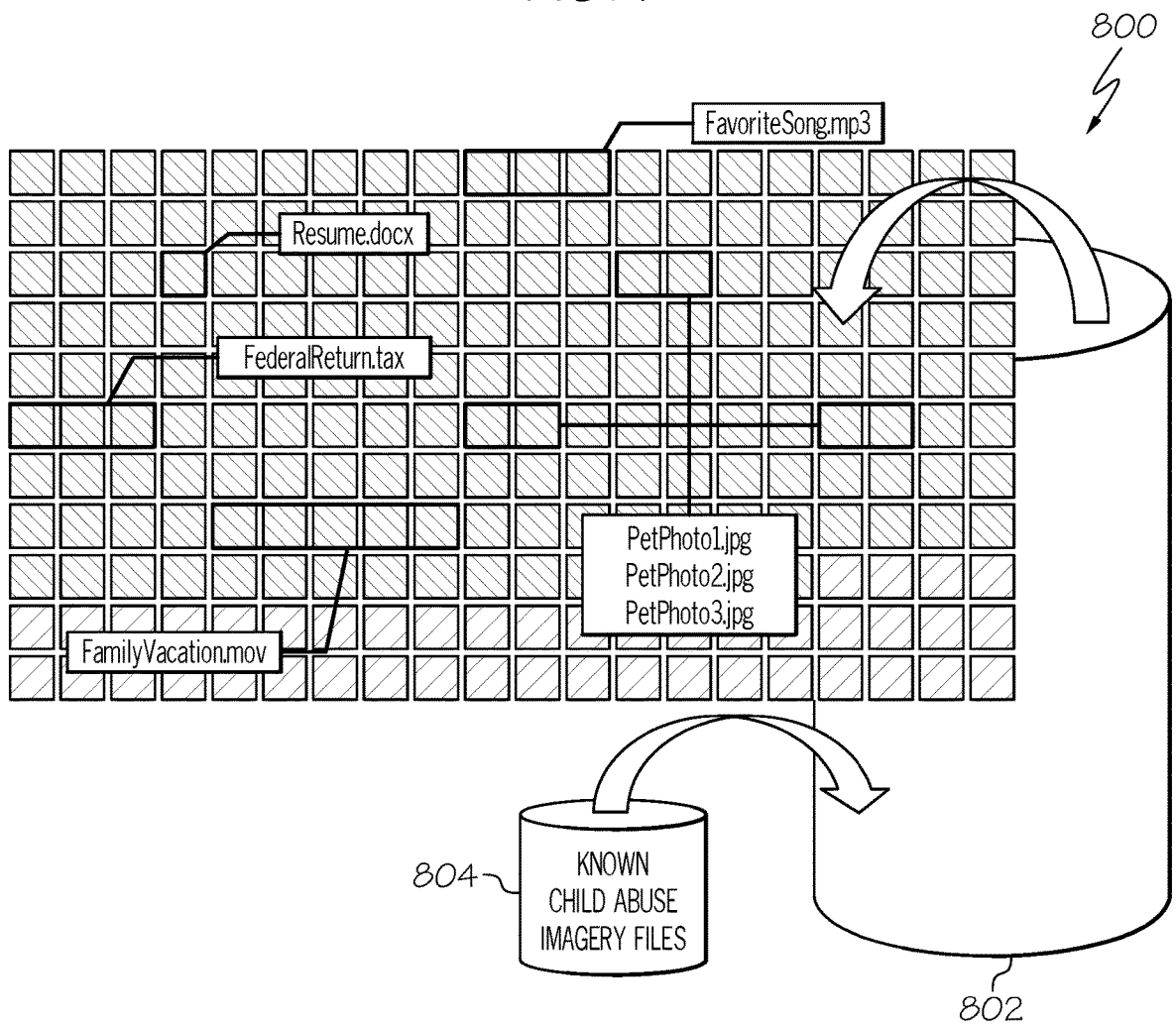
FIG. 7 shows an example of a file header and lists a variety of methods used by conventional forensic tools to recover files from unallocated space.
FIG. 8 is high level diagram illustrating the contrast in size between a database of file hashes and a database of sector and/or cluster hashes.

FIG. 7 is a block diagram 700 of the various methods used for deleted file recovery in conventional forensic applications. The recovery methods include checking file header/footer analysis 702, frame header identification 704, magic bytes 706, byte count (file size) 708, and plain-text language recognition 710. When a file is deleted it still exists in the same location on the hard drive, however the computer no longer knows the order in which the file has been written. When a file has been deleted it may be possible to find the first block, but nearly impossible for the investigator to find the entire file.

FIG. 8 is high level diagram 800 illustrating indexes into a database of CSE content 802. The present patent application describes a system with a hash-generation program for calculating required hash values when run against their library of known CSE data 804. The resulting database is extremely large i.e. more than one billion rows in size 802. Stated differently, the present invention generates and indexes these files into 1+ Billion identifiable, scannable pieces from which investigators will be able to identify any CSE imagery file from devices to include deleted files via a fully automated application.

Figure 9:
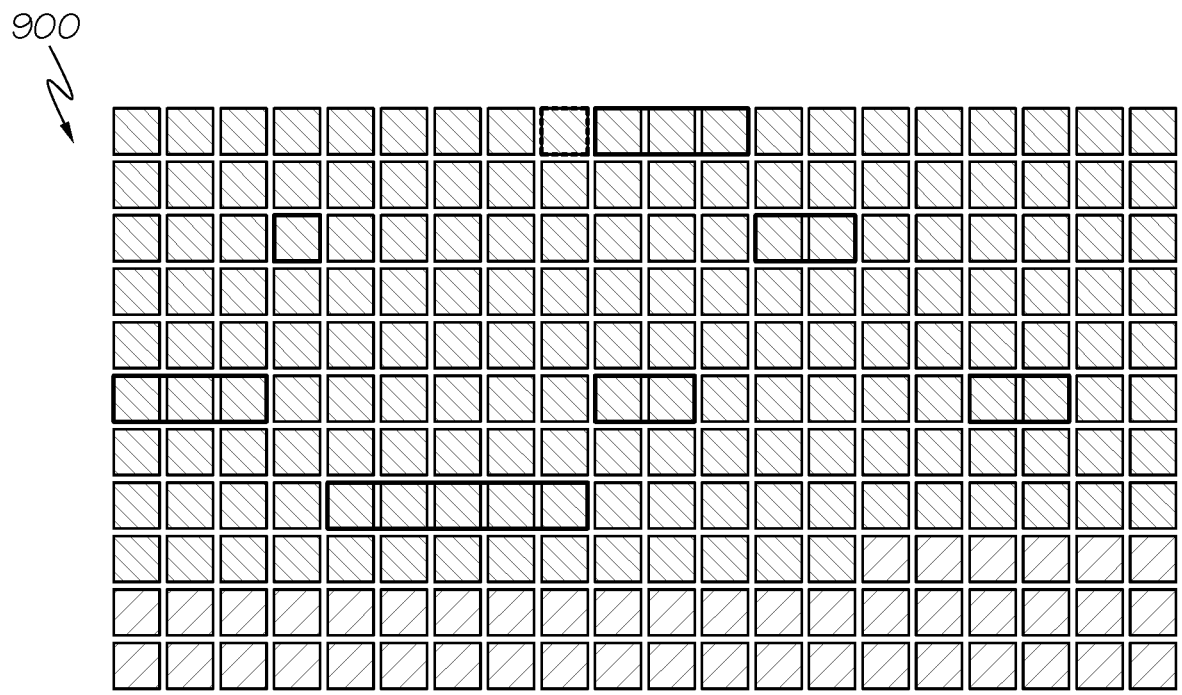
FIG. 9 is block diagram illustrating shortcoming with currently available computer forensics tools.

FIG. 9 is block diagram 900 illustrating improvements over the currently available computer forensic tools. Conventional forensic tools rely on the comparison of a full file hash to identify CSE material. This creates long processing time as all suspected files must be completely retrieved from the drive to calculate this hash value. Unlike the current forensic tools search a hard drive for the full file hash, the present invention searches for fragments. Therefore even for non-deleted files, this creates long processing time to scan and identify entire movie files.

It is important to note that when a file is deleted it still exists in the same location on the hard drive, however the computer no longer knows the order in which the file has been written. Furthermore, when a file has been deleted it may be possible to find the first block, but nearly impossible for the investigator to find the entire file.

The present invention scans on the block level instead of full files, it will instantly know if CSE imagery file has been detected vs. having to locate the entire file.

Figure 10:
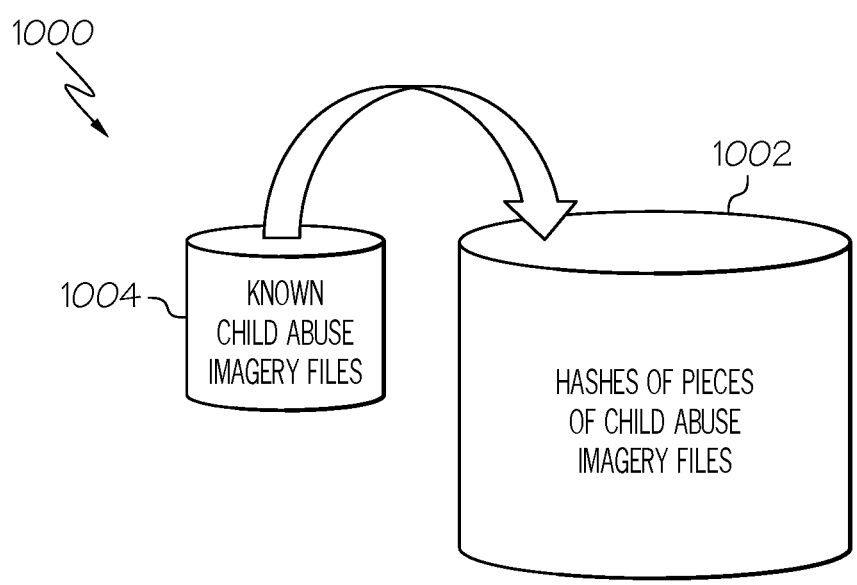
FIG. 10 is block diagram illustrating improvements over the currently available computer forensics tools of FIG. 9.

FIG. 10 is block diagram 1000 illustrating improvements over current computer forensics tools of FIG. 9. The present invention generates and indexes existing CSE imagery files into a billion or more identifiable pieces 1002 from which investigators will be able to identify any CSE imagery files 1004 from devices (including deleted files) in a fully automated way.

Because the present invention scans on the block level instead of full files, it will instantly know if any CSE imagery clusters has been detected vs. having to locate the entire file.

The results are that forensic evidence is retrieved many times faster and now using the present invention is able to find never before found deleted file imagery in an automated way.

A prototype of a scanning application has been developed which successfully locates file pieces using a small database of pre-calculated known image hashes.

In cooperation with various CSE image repositories around the world, the present invention revolutionizes the field of computer forensics by automating the process of identifying deleted file chunks. The present invention has two components. A client component to identify data chunks and a server component for storage and indexing technology for the over 1 billion records relating to the data chunks necessary to run the software.

The present invention uses hash values which constitute unique file-identifiers, to provide the capability for investigators to scan devices for those billions of fractional components of CSE image repositories files.

Any of the millions of known CSE imagery files will be identifiable from the deleted files of a suspect's device in an automated fashion.

The present invention provides a comprehensive, automated, search and recovery, which will be both efficient and productive.

The present invention provides greater protection to children by affording efficiency in establishing probable cause, identifying evidence, and expediting the prosecution of child predators. A successful forensic examination of a suspect's hard drive—the restoration and identification of previously undetectable deleted computer files containing images of children being abused will help get more child abusers off the street.

The present invention is available for use both by investigators conducting on-scene triage as well as by forensic examiners in the lab.

Preliminary Test Evaluation of the Tool

During the initial design and software coding process, the present invention is testing the efficiency and effectiveness of its hash value assignment methodology internally using a comparable group of innocuous files, such as mp3s or video files. Specifically, the hash value assignment methodology will be evaluated using the following objectively-verifiable criteria: (1) speed, (2) efficiency, (3) cost effectiveness, (4) data storage capacity demand, and (5) accuracy.

The present invention will be deployed to label the data clusters obtained from our partnering image libraries. Law enforcement agency partners will field test the program and the user interface to confirm that it performs up to expectations in real-life situations. During implementation of the present invention, feedback from law enforcement is used for additional features and other improvements that would enhance the tool's usability and effectiveness in the field.

Client Side Flow

Figure 11:
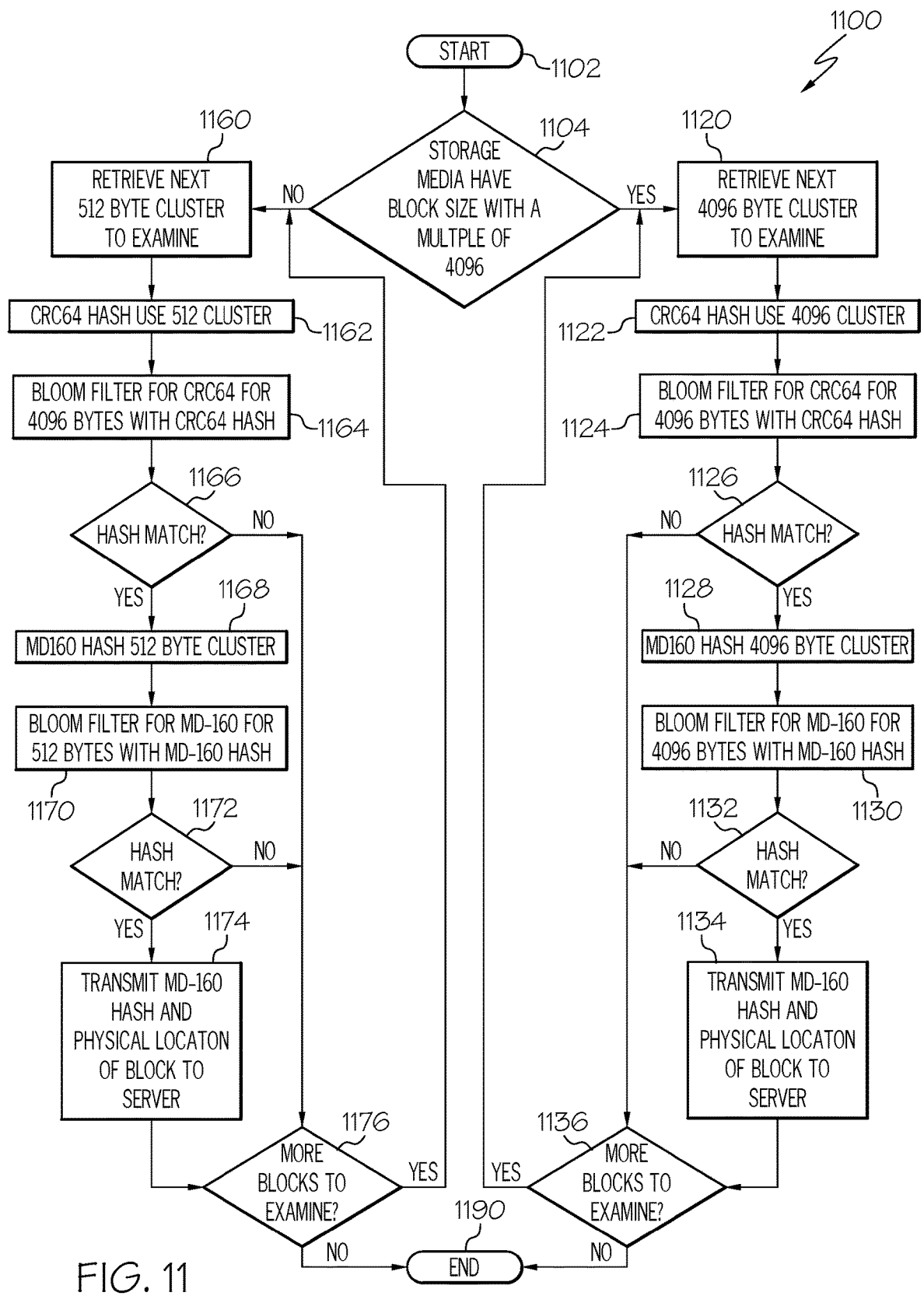
FIG. 11 is a flow diagram on a client computer of examining a storage media.

FIG. 11 is a flow diagram 1100 on a client computer of examining a storage media. In this example flow for identifying portions of data on a storage media. It is important to note that this flow can run on the original computer in which the storage media is connected. In another example, the storage media from an original computer is communicatively coupled to another client computer operated by forensic personnel. The term communicatively coupled means, wired, wireless, and may or may not be directly connected.

The process begins in step 1102 and proceeds immediately to step 1104 with accessing a storage media commutatively coupled to client computer. A determination is made if the storage media used a block size that is a multiple of 4096 bytes.

In response to the storage media having a block size that is a multiple of 4096 bytes the process continues down the right side of the diagram to step 1120. In step 1120, a next 4096 byte cluster and position is retrieved and continues to step 1122.

Next in step 1122, a first hash function on the 4096 byte cluster to produce a first hash value is used and continues to step 1124.

Next in step 1124, a first bloom filter to the first hash value is applied.

The bytes represent unallocated bytes on the storage media or are allocated bytes on the storage media. The process continues to step 1126.

In step 1126, a test is made to determine if the first bloom filter returns a possibility of the first hash value in a first set of data. If the first hash value is not in the first data set, the process continues down to the bottom to determine if more blocks are to be examined in step 1136.

In the even the first hash value is in the first data set, a second hash function is used on the 4096 byte cluster to produce a second hash value in step 1128 and the process continues to step 1130.

In step 1130, a second bloom filter is applied to the second hash value and continues to step 1132.

In step 1132, a test is made to determine if the second bloom filter returns a possibility of the second hash value in a second set of data. In the event the second bloom filter returns the possibility, in step 1134 transmitting the second hash value and the position of the hash value to a second computer.

Figure 12:
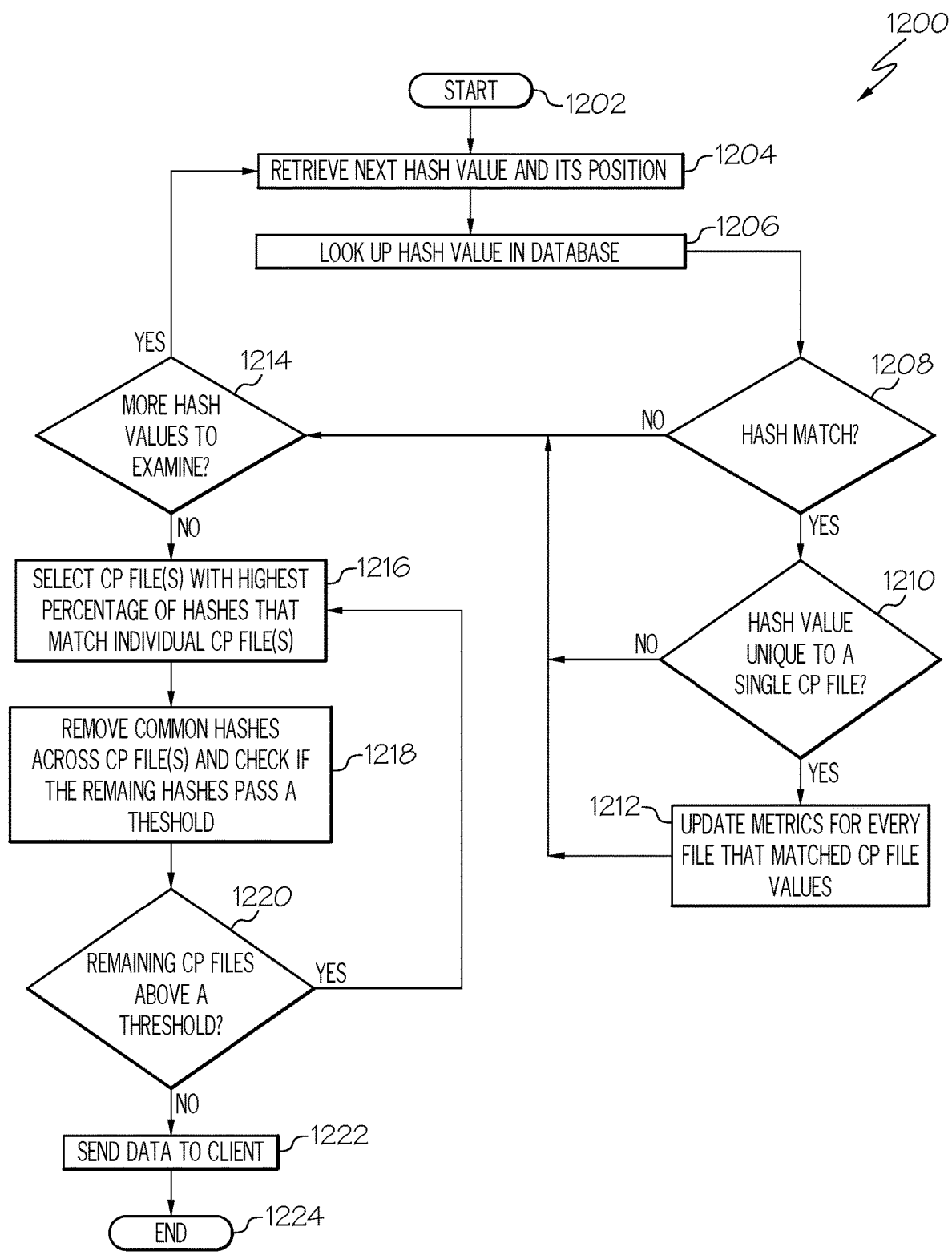
FIG. 12 is a flow diagram on a server of comparing the hash values and physical locations of blocks received from the client computer flow of FIG. 11.

Results data of matching the group to a database of second hash values and physical block identifiers is returned from a server in flow of FIG. 12. The results data may include one or more of a number of matches, an identification of the storage media, a hash function of a full file that has been matched, a percentage of blocks that have been matched to the full file, or a mapping of logical blocks that have been matched to physical blocks on the storage media.

In one example, a blocked list is used to compare the second hash value. Only if the second hash value is not on the blocked list, the second hash value and the position to the second computer in response to the second hash value is transmitted. The comparison of a block list is done early on to skip further analysis on bloom filters.

In another example, the second hash value and the position in a group are cached until one or more of: 1) all the 4096 byte clusters are examined; 2) a period of time has expired; or 3) a threshold of a cache size has been reached, and then transmitting the group to the second computer.

A test is made to determining whether there are more 4096 byte clusters to be examined and the process continues to the top in step 1104 as shown.

In response to the storage media having a block size that is not a multiple of 4096 bytes the process continues down the left side of the diagram to step 1160. A next 512 byte cluster and position is retrieved and proceeds to step 1162.

In step 1162, a third hash function on the 512 byte cluster to produce a third hash value is used. Next, a third bloom filter to the third hash value is applied in step 1164. The process continues to step 1166.

In step 1166, a test is made to determine if the third bloom filter returns a possibility of the third hash value in a first set of data. If the third hash value is not in the first data set, the process continues down to the bottom to determine if more blocks are to be examined in step 1176.

In the event the third hash value is in the first data set the process continues to step 1168.

Next in step 1168, a fourth hash function is used on the 512 byte cluster to produce a fourth hash value. The process continues to step 1170.

In step 1170, a fourth bloom filter is applied to the fourth hash value. The process continues to step 1172.

In step 1172, a test is made to determine if the second bloom filter returns a possibility of the fourth hash value in a second set of data. In the event the fourth bloom filter returns the possibility, transmitting the fourth hash value and the position of the hash value to a second computer in step 1174.

In step 1176, a test is made to determining whether there are more 512 byte clusters to be examined and the process continues to the top in step 1160 as shown.

In one example, the third hash function is a CRC64 function and the fourth hash function is a MD-160 hash function.

Server Side Flow

FIG. 12 is a flow diagram 1200 on a server of comparing hash and physical locations of blocks received from the client computer flow of FIG. 11. The process begins in step 1202 and continues to step 1204 with receiving a group or hash values and a physical location of a data block on a storage media corresponding to each of the hash values, the storage media communicatively coupled to a first computer being reviewed for portions of data. The process continues to step 1206.

Next in step 1206, in response to receiving the group of hash values, for each hash value in the group of hash values performing, a next hash value in a database is examined in step 1208.

In response to the next hash value matching in the database in step 1208, the process continues to step 1210.

Step 1210 determines if the hash value that matches is unique to a set of target data file values and continues to step 1212.

In response to the hash value being unique to a set of target data file values, updating metrics for every data file that match the target data file values in step 1214.

Otherwise in step 1214 returning to step determining if there are more hash values to be examined in the group of hash values.

In response to more hash values being available, returning to step 1204 "Retrieve Next Hash Value and Its Position". Otherwise the process continues to step 1216 to select CSE file(s) with highest percentage of hashes that match individual CSE file(s). Selecting target data files with a highest percentage of hash values that match the target data file values.

Next in step 1218, hash values are removed that match across all target data files and determining if any the remaining number of hash values pass a threshold. The process continues to step 1220.

In step 1220, in response to the remaining number of target hashes being above a threshold, return to step 1216, otherwise sending results data to the first computer in step 1222 and ends in step 1224.

Hash plus position gives server a reference point, which physical block is exact match. A large CSE data file can have a million blocks. Server gives back report that it particular CSE file is 95% complete and to compare and rebuild the system needs to have these blocks.

In one example, the larger number of blocks matched the easier it is to rebuild a file. Typically 20% of the file blocks matching are enough to rebuild the content when the header is present. Different variations of file e.g. because was not downloaded completely. More variations of files in database means more hashes to compare. Like an election i.e. first block belongs to files 1,2,3,4,5. Second block belongs to files 1, 3, 5, third block only belongs to 5. Therefore 5 is more important. Report what is highest match.

No content of CSE is needed. Only hash values are needed.

Examples or results data being sent to the client: {"matches":[{"resId":1,"sha1": "5DZSDQ4SS44CLY2OJVAXRCGSC7OKLAIL","cataloged_name":" ","size":113912,"compMin":96.43,"compMax":100.00,"logBlocks":[[0,26]],"phyBlocks":[[9,35], [37,63],[65,91]],"mapBlocks":[[0,9],[1,10],[2,11],[3,12],[4, 13],[5,14],[6,15],[7,16],[8,17],[9,18],[10,19],[11,20],[12, 21],[13,22],[14,23],[15,24],[16,25],[17,26],[18,27],[19,28], [20,29],[21,30],[22,31],[23,32],[24,33],[25,34],[26,35]]}]}

In the right bottom, two decision boxes, they could be fused into one, but the action is to update metrics to CSE file OR files. This because very similar files can have the same block, so, the important thing is to accrue metrics on not only a single, but possibly more than one CSE files.

Then, because of the issue mentioned above, there is a post-processing loop. One, if there is a candidate, pick the one with the greatest completion and assign the physical blocks to it. Second, drop the assigned blocks to the other candidates, then, loop back to the "if there is a candidate" condition block.

Operating Environment

Figure 13:
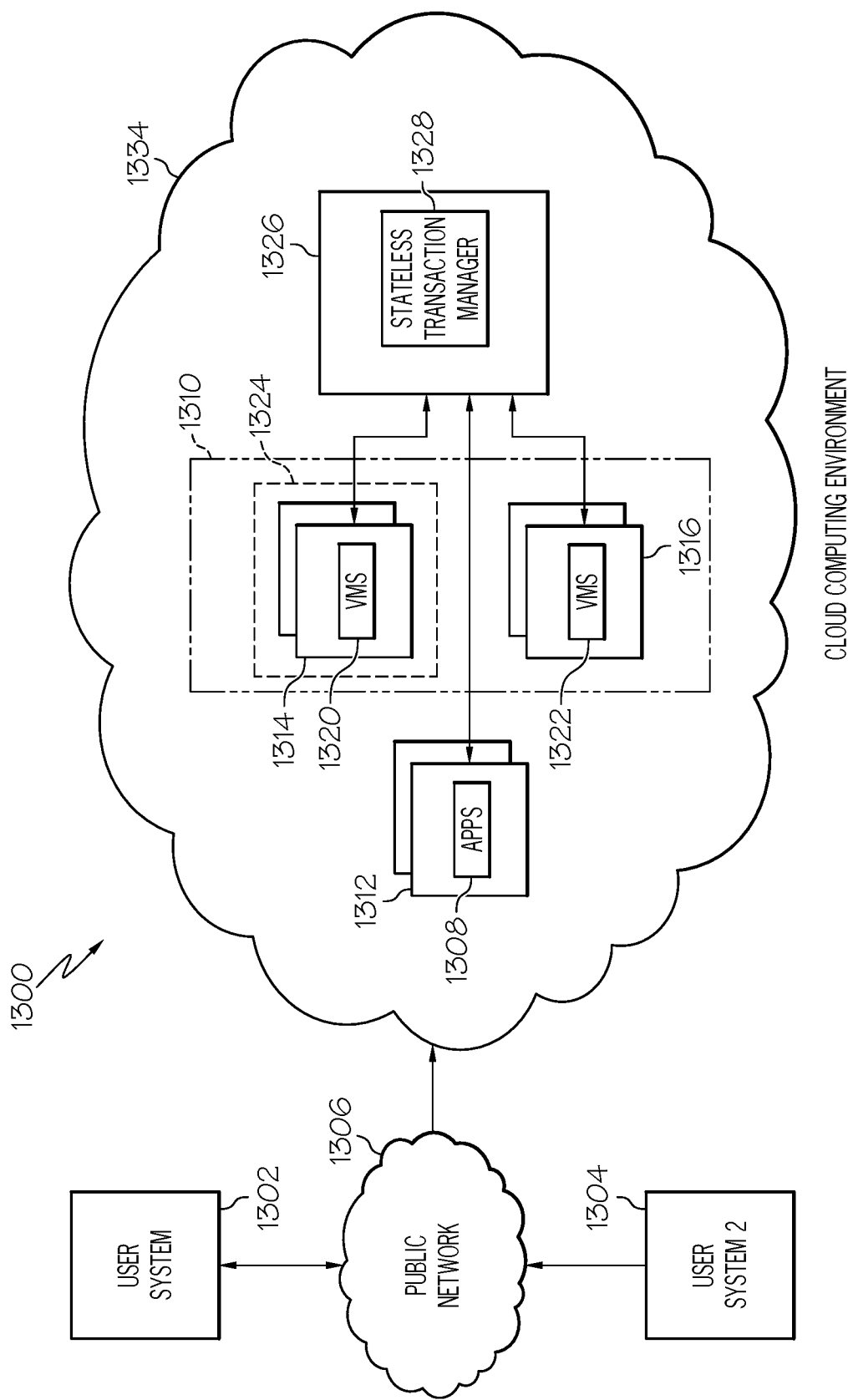
FIG. 13 is an overall system of client-server in a cloud-based environment.

FIG. 13 shows one example of client-server in a cloud-based environment 1300 for identifying content on a storage media whether or not the content has been deleted. It should be noted that although the following discussion is directed to a cloud computing environment various embodiment are not limited to such environment and are application to non-cloud computing environments as well. In particular, FIG. 13 shows one or more client/user systems 1302, 1304 communicatively coupled to one or more cloud computing environments 1304 via a public network 1306 such as the Internet. The user systems 1302, 1304 can include, for example, information processing systems such as desktop computers, laptop computers, servers, wireless devices (e.g., mobile phones, tablets, personal digital assistants, etc.), and the like. In this example, the user systems 1302, 1304 run the client side flow 1100 of FIG. 11.

The user systems 1302, 1304 access the cloud computing environment 1306 via one or more interfaces (not shown) such as a web browser, application, etc. to utilize resources provided by the environment 1304. For example, FIG. 13 shows a plurality of resources such as applications 1308 and computing resources 1310 available within the cloud computing environment 1334. The cloud computing environment 1334 in this example runs the server side flow 1200 of FIG. 12. Computing resources 1310 include but are not limited to, processing, storage, networking, and other fundamental computing resources. Resources 1308, 1310 are provided by and/or are hosted on a plurality of physical information processing systems 1312, 1314, 1316 and/or a plurality of virtual machines 1320, 1322 being executed by physical systems 1314, 1316. A plurality of physical systems 1312, 1314, 1316, virtual machines 1320, 1322, or a combination thereof grouped together for providing a resource(s) is referred to as a "cluster" 1324.

In one example, a cloud user (via a user systems 1302, 1304) utilizes the cloud environment 1334 to deploy a multi-tier web application. In this example, a multi-tier web application is an application (software designed to enable a user to perform a given task) accessible over a network whose presentation, logic (application processing), and data storage processes are performed at physically separate tiers. For example, the presentation processes can be performed on a web server tier; the application processing can be performed on an application server tier; and the data storage processes can be performed on a database server tier. Each of the web server, application server, and database server tiers can be comprised of one or more of the information processing systems 1314, 1316, and/or VMs 1320, 1322 in the cloud environment 1334.

The cloud computing environment 1334 further comprises one or more information processing systems 1326. It should be noted that the information processing system 1326 is not required to reside within the cloud environment 1306.

Example Network Device

Figure 14:
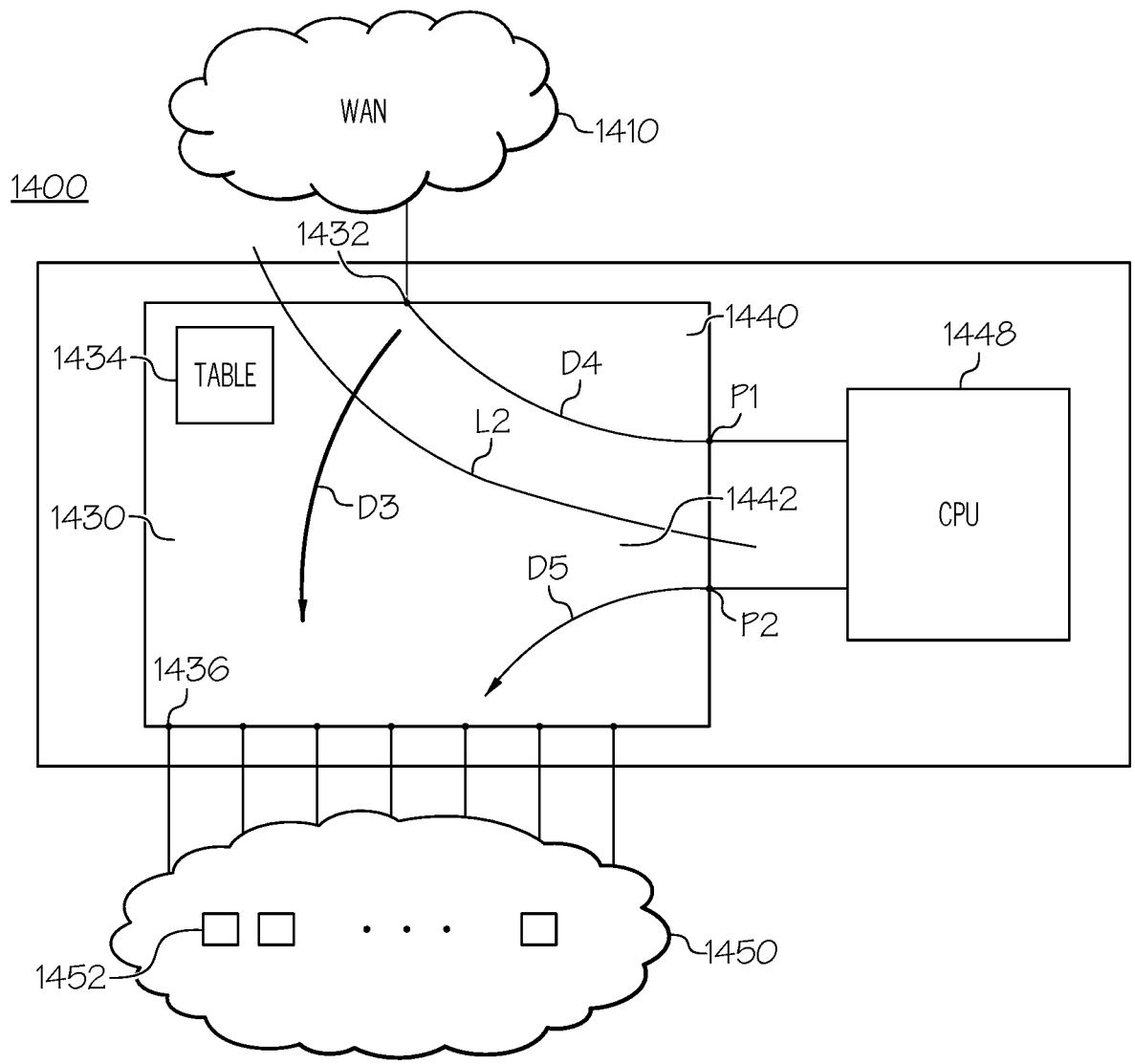
FIG. 14 is a schematic diagram illustrating the architecture of a network device according to another embodiment of the present invention.

FIG. 14 is a schematic diagram illustrating the architecture of a network device 1400 according to another embodiment of the present invention. In this example, the network device 1400 runs the client side flow 1100 of FIG. 11.

One side of a network device 1400 is connected to a wide area network (WAN) 1410, the other side of the network device 1400 is connected to a local area network (LAN) 1450, and the local area network terminal 1450 has plurality of computers 1452. As such, a data packet could be forwarded from the wide area network terminal 1450 to the plurality of computers 1452 of the local area network terminal 1450 through the network device 1400.

The network device 1400 comprises a switch chip 1430, a forwarding table 1434 and a central processing unit (CPU) 1448. The switch chip 1430 comprises a wide area network port 1432, plurality of local area network ports 1436, a first connecting port P1 and a second connecting port P2. The wide area network port 1432 is connected to the wide area network terminal 1450. The plurality of local area network ports 1412 are connected to the local area network terminal 1450.

The first connecting port P1 and the second connecting port P2 are connected to the central processing unit 1448. The data packet to be forwarded includes an unicast packet, a multicast packet or a broadcast packet. The central processing unit 1448 may record the data packet forwarding path in a forwarding table 1434. Any type of data packet could be forwarded from one of the plural local area network ports 1436 to another of the plurality of local area network ports 1436.

An example of the network device 1400 is an IP sharer for providing a network address translation (NAT) function. Due to the NAT function, the real IP address of the network device 1400 at the wide area network 1410 could be shared to the plurality of computers 1452 of the local area network 1450. The sharing method creates plurality of virtual IP addresses according to the real IP address. As such, the plurality of computers 1452 of the local area network 1450 have respective virtual IP addresses.

For allowing the network device 1400 to work in the NAT mode, the central processing unit 1448 will set a task of segmenting virtual local area network to be implemented by the switch chip 1430. After the task of segmenting virtual local area network is implemented, the switch chip 1430 is segmented into a first virtual local area network (VLAN#1) terminal 1440 and a second virtual local area network (VLAN#2) terminal 1442. A logic segmentation line is indicated as the dotted line L2.

The cloud computing environment 1334 of FIG. 13 in this example runs the server side flow 1200 of FIG. 12. Unlike the clients in FIG. 13 that are searching hard drives to match clusters of files, in this example the network device 1400 is matching one or more packets being routed between the wide area network 1410 and one or more of the plurality of computers 1452 in the local area network 1450. In another example embodiment the network device 1400 is matching one or more packets being routed among two or more of the plurality of computers 1452 in the local area network 1450.

Example Computer System

Figure 15:
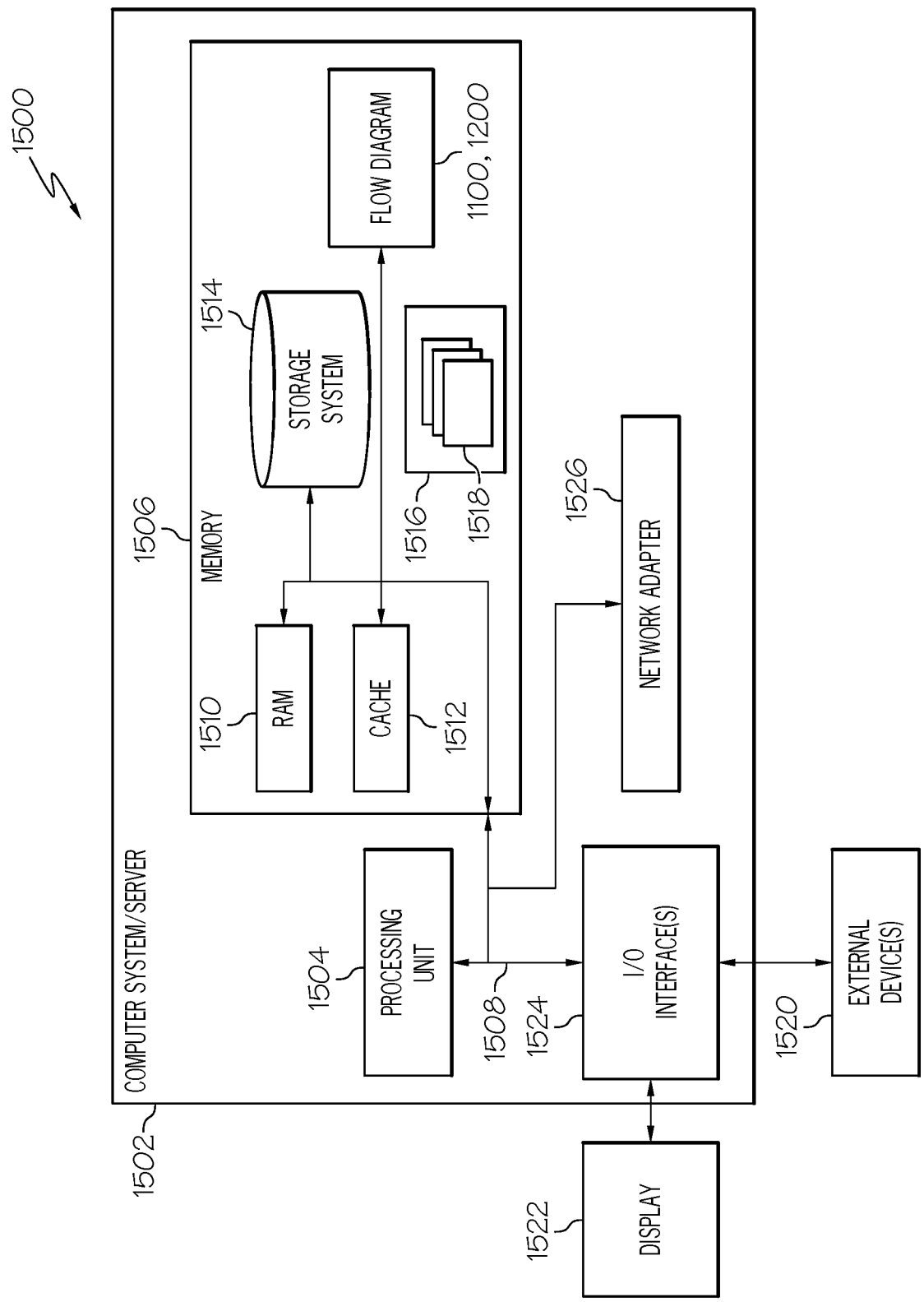
FIG. 15 is an example hardware implementation of the client and/or cloud computer upon which flow diagrams of FIG. 11 and FIG. 12 can operate.

FIG. 15 is an example hardware implementation of the client and/or cloud computer upon which flow diagrams of FIG. 11 and FIG. 12 can operate. FIG. 15 illustrates one example of a processing node and is not intended to suggest any limitation as to the scope of use or functionality of embodiments of the invention described herein. Regardless, the computing node 1500 is capable of being implemented and/or performing any of the functionality set forth hereinabove.

In computing node 1500 there is a computer system/server 1502, which is operational with numerous other general purpose or special purpose computing system environments or configurations. Examples of well-known computing systems, environments, and/or configurations that may be suitable for use with computer system/server 1502 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 1502 in cloud computing node 1500 is shown in the form of a general-purpose computing device. The components of computer system/server 1502 may include, but are not limited to, one or more processors or processing units 1504, a system memory 1506, and a bus 1508 that couples various system components including system memory 1506 to processor 1504.

Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1506, in one embodiment, implements the block diagram of FIG. 13 and the flow charts of FIGS. 11 and 12. The system memory 1506 can include computer system readable media in the form of volatile memory, such as random access memory (RAM) 1510 and/or cache memory 1512. Computer system/server 1502 may further include other removable/non-removable, volatile/non-volatile computer system storage media. By way of example only, storage system 1514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of various embodiments of the invention.

Program/utility 1516, having a set (at least one) of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. The computer program product is typically non-transitory but in other examples it may be transitory.

Computer system/server 1502 may also communicate with one or more external devices 1520 such as a keyboard, a pointing device, a display 1522, etc.; one or more devices that enable a user to interact with computer system/server 1502; and/or any devices (e.g., network card, modem, etc.) that enable computer system/server 1502 to communicate with one or more other computing devices. Such communication can occur via I/O interfaces 1524. Still yet, computer system/server 1502 can communicate with one or more networks such as a local area network (LAN), a general wide area network (WAN), and/or a public network (e.g., the Internet) via network adapter 1526. As depicted, network adapter 1526 communicates with the other components of computer system/server 1502 via bus 1508. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

Non-Limiting Examples

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for identifying portions of data on a storage media, the method comprising:
   accessing a storage media commutatively coupled to a first computer;
   determining if the storage media has a block size with a multiple of 4096 bytes;
   in response to the storage media having a block size that is a multiple of 4096 bytes performing:
   a) selecting a next 4096 byte cluster and position;
   b) using a first hash function on the selected 4096 byte cluster to produce a first hash value;
   c) applying a first bloom filter to the first hash value;
   d) in response to the first bloom filter returning a possibility of the first hash value in a first set of data, performing
   e) using a second hash function on the selected 4096 byte cluster to produce a second hash value;
   f) applying a second bloom filter to the second hash value;
   g) in response to the second bloom filter returning a possibility of the second hash value in a second set of data, transmitting the second hash value and the position to a second computer;
   h) determining whether there are more 4096 byte clusters to be examined; and
   i) in response to more 4096 byte clusters to be examined, returning to step a.

2. The computer-implemented method of claim 1, wherein in response to the second bloom filter returning the possibility of the second hash value in the second set of data, comparing the second hash value against a blocked list, and transmitting the second hash value and the position to the second computer in response to the second hash value not being in the blocked list.

3. The computer-implemented method of claim 2, wherein in response to the second bloom filter returning a possibility of the second hash value in the second set of data, caching the second hash value and the position in a group until one or more of:
   all the 4096 byte clusters are examined,
   a period of time has expired, or
   a threshold of a cache size has been reached,
   and then transmitting the group to the second computer.

4. The computer-implemented method of claim 3, further comprising:
   receiving results data of matching the group to a database of second hash values and physical block identifiers.

5. The computer-implemented method of claim 4, wherein the results data includes one or more of:
   a number of matches,
   an identification of the storage media,
   a hash function of a full file that has been matched,
   a percentage of blocks that have been matched to the full file, or
   a mapping of logical blocks that have been matched to physical blocks on the storage media.

6. The computer-implemented method of claim 1, wherein the first hash function is a CRC64 function and the second hash function is a MD-160 hash function.

7. The computer-implemented method of claim 1, wherein the bytes are unallocated on the storage media or are allocated on the storage media.

8. The computer-implemented method of claim 1, further comprising:
   j) in response to the storage media not having a block size that is a multiple of 4096 bytes, but is a multiple of 512 bytes performing:
   k) retrieving a next 512 byte cluster and position;
   l) using a third hash function on the 512 byte cluster to produce a third hash value;
   m) applying a third bloom filter to the third hash value;
   n) in response to the third bloom filter returning a possibility of the third hash value in a third set of data, performing
   p) using a fourth hash function on the 512 byte cluster to produce a fourth hash value;
   q) applying a fourth bloom filter to the fourth hash value;
   r) in response to the fourth bloom filter returning a possibility of the fourth hash value in a fourth set of data, transmitting the fourth hash value and the position to the second computer; and
   h) determining whether there are more 512 byte clusters to be examined; and,
   s) in response to more 512 byte clusters to be examined, returning to step k.

9. The computer-implemented method of claim 8, wherein the fourth bloom filter returning the possibility of the fourth hash value in the fourth set of data, comparing the fourth hash value against a blocked list, and transmitting the fourth hash value and the position to the second computer in response to the fourth hash value not in the blocked list.

10. The computer-implemented method of claim 9, wherein in response to the fourth bloom filter returning a possibility of the fourth hash value in a fourth set of data, caching the fourth hash value and the position in a group until one or more of:
   all the 512 byte clusters are examined,
      a period of time has expired, or
      a threshold of a cache size has been reached,
   and then transmitting the group to the second computer.

11. The computer-implemented method of claim 10, further comprising:
   receiving results data of matching the group to a database of fourth hash values and physical blocks identifiers.

12. The computer-implemented method of claim 11, wherein the results data includes one or more of:
   a number of matches,
   an identification of the storage media,
   a hash function of a full file that has been matched,
   a percentage of blocks that have been matched to the full file, or
   a mapping of logical blocks that have been matched to physical blocks on the storage media.

13. The computer-implemented method of claim 8, wherein the third hash function is a CRC64 function and the fourth hash function is a MD-160 hash function.

14. The computer-implemented method of claim 8, wherein the bytes are unallocated on the storage media or are allocated on the storage media.

15. A computer-implemented method for ranking deleted portions of data on a storage media, the method on a second computer comprising:
   receiving a group of hash values and a physical location of a data block on a storage media corresponding to each of the hash values, the storage media communicatively coupled to a first computer being reviewed for portions of data;
   in response to receiving the group of hash values, for each hash value in the group of hash values performing:
      a) looking up a next hash value in a database;
      b) updating completion metrics for every data file for which the next hash value matches a data file hash value within a set of data file hash values for that data file;
      c) determining if there are more hash values to be examined in the group of hash values
         d) in response to more hash values being available, returning to step a, otherwise proceeding to step e;
         e) using the completion metrics to select a data file with a highest percentage of data hash values of its set of data file hash values that match with the received group of hash values;
         f) remove hash values that match the selected data file at step e from the completion metrics of all other data files that they also match with, and determining for each of the other data files if there are enough remaining matches to pass a threshold; and
   g) in response to the remaining number of matches being above a threshold, return to step e, otherwise sending results data identifying data files selected at step d to the first computer.

16. A system for identifying portions of data on a storage media, the system comprising:
   a computer memory capable of storing machine instructions; and
   a hardware processor in communication with the computer memory, the hardware processor configured to access the computer memory, the hardware processor performing
   accessing a storage media commutatively coupled to a first computer;
   determining if the storage media has a block size with a multiple of 4096 bytes;
   in response to the storage media having a block size that is a multiple of 4096 bytes performing:
      a) selecting a next 4096 byte cluster and position;
      b) using a first hash function on the selected 4096 byte cluster to produce a first hash value;
      c) applying a first bloom filter to the first hash value;
      d) in response to the first bloom filter returning a possibility of the first hash value in a first set of data, performing
      e) using a second hash function on the selected 4096 byte cluster to produce a second hash value;
      f) applying a second bloom filter to the second hash value;
      g) in response to the second bloom filter returning a possibility of the second hash value in a second set of data, transmitting the second hash value and the position to a second computer;
      h) determining whether there are more 4096 byte clusters to be examined; and
      i) in response to more 4096 byte clusters to be examined, returning to step a.

17. A non-transitory computer program product tangibly embodying computer readable instructions which, when implemented, cause a computer to carry out the steps of a method for identifying portions of data on a storage media, comprising:
   accessing a storage media commutatively coupled to a first computer;
   determining if the storage media has a block size with a multiple of 4096 bytes;
   in response to the storage media having a block size that is a multiple of 4096 bytes performing:
      a) selecting a next 4096 byte cluster and position;
      b) using a first hash function on the selected 4096 byte cluster to produce a first hash value;
      c) applying a first bloom filter to the first hash value;
      d) in response to the first bloom filter returning a possibility of the first hash value in a first set of data, performing
      e) using a second hash function on the selected 4096 byte cluster to produce a second hash value;
      f) applying a second bloom filter to the second hash value;
      g) in response to the second bloom filter returning a possibility of the second hash value in a second set of data, transmitting the second hash value and the position to a second computer;
      h) determining whether there are more 4096 byte cluster to be examined; and
      i) in response to more 4096 byte cluster to be examined, returning to step a.

18. The non-transitory computer program product of claim 17, wherein in response to the second bloom filter returning the possibility of the second hash value in the second set of data, comparing the second hash value against a blocked list, and transmitting the second hash value and the position to the second computer in response to the second hash value being not in the blocked list.

19. The non-transitory computer program product of claim 18, wherein in response to the second bloom filter returning a possibility of the second hash value in the second set of data, caching the second hash value and the position in a group until one or more of:

all the 4096 byte clusters are examined,
    a period of time has expired, or
    a threshold of a cache size has been reached,
and then transmitting the group to the second computer.

20. The computer-implemented method of claim 1, further comprising performing the following on a second computer, receiving a group of hash values and a physical location of a data block on a storage media corresponding to each of the hash values, the storage media communicatively coupled to a first computer performing preceding steps a through i;

in response to receiving the group of hash values, for each hash value in the group of hash values performing:

a-a) looking up a next hash value in a database;

b-b) updating completion metrics for every data file for which the next hash value matches a data file hash value within a set of data file hash values for that data file;

c-c) determining if there are more hash values to be examined in the group of hash values d-d) in response to more hash values being available, returning to step a-a, otherwise proceeding to step e-e;

e-e) using the completion metrics to select a data file with a highest percentage of data hash values of its set of data file hash values that match with the received group of hash values;

f-f) remove hash values that match the selected data file at step e-e from the metrics of all other data files that they also match with, and determining for each of the other data files if there are enough remaining matches to pass a threshold; and g-g) in response to the remaining number of matches being above a threshold, return to step e-e, otherwise sending results data identifying data files selected at step d-d to the first computer.

* * * * *